(12) United States Patent
Oezyilmaz et al.

(10) Patent No.: US 12,365,590 B2
(45) Date of Patent: Jul. 22, 2025

(54) MONOLITHIC AND FRACTAL CARBON FOAMS AND METHODS OF PREPARING AND USING SAME

(71) Applicant: National University of Singapore, Singapore (SG)

(72) Inventors: Barbaros Oezyilmaz, Singapore (SG); Jonghak Lee, Singapore (SG); Clarissa Chui Ling Wong, Singapore (SG); Cagdas Cetin, Singapore (SG); Xiao Feng Lim, Singapore (SG); Yong Kang Ong, Singapore (SG)

(73) Assignee: National University of Singapore, Singapore (SG)

( * ) Notice: Subject to any disclaimer, the term of this patent is extended or adjusted under 35 U.S.C. 154(b) by 843 days.

(21) Appl. No.: 17/613,421

(22) PCT Filed: May 13, 2020

(86) PCT No.: PCT/SG2020/050273
§ 371 (c)(1),
(2) Date: Nov. 22, 2021

(87) PCT Pub. No.: WO2020/236079
PCT Pub. Date: Nov. 26, 2020

(65) Prior Publication Data
US 2022/0219987 A1    Jul. 14, 2022

Related U.S. Application Data

(60) Provisional application No. 62/851,793, filed on May 23, 2019.

(51) Int. Cl.
*C01B 32/05*   (2017.01)
*C01B 32/18*   (2017.01)
(Continued)

(52) U.S. Cl.
CPC .............. *C01B 32/05* (2017.08); *C01B 32/18* (2017.08); *C04B 35/528* (2013.01); *C04B 35/64* (2013.01);
(Continued)

(58) Field of Classification Search
CPC ..... C01B 32/05; C01B 32/18; C01P 2004/64; C01P 2006/10; C01P 2006/14; C01P 2006/20
See application file for complete search history.

(56) References Cited

U.S. PATENT DOCUMENTS

| 10,984,830 B2 | 4/2021 | Ozyilmaz et al. |
| 11,114,674 B2 | 9/2021 | Ozyilmaz et al. |

(Continued)

FOREIGN PATENT DOCUMENTS

| CN | 107021761 A | * | 8/2017 | ........... C04B 35/584 |
| CN | 108530098 A |   | 9/2018 | |

(Continued)

OTHER PUBLICATIONS

Rode, Andrei V., et al. "Structural analysis of a carbon foam formed by high pulse-rate laser ablation." Applied Physics A 69 (1999): S755-S758.*

(Continued)

*Primary Examiner* — Richard M Rump
(74) *Attorney, Agent, or Firm* — Cesari and McKenna, LLP

(57) ABSTRACT

A monolithic carbon foam formed of fused onion-like carbon (OLC) nanoparticles, in which the monolithic carbon foam contains interconnected pores, has a volumetric micropore surface area of 200 $m^2$/cc-600 $m^2$/cc, and has an electrical conductivity of 20 cm-140 S/cm. Also disclosed are a fractal carbon foam prepared from the monolithic carbon foam, methods of preparing both foams, and super- (Continued)

capacitors constructed therefrom. Specifically, the methods of preparing the foams comprising, inter alia, spark plasma sintering the OLC nanoparticles at a pressure of 30 MPa-1000 MPa and a temperature of 300° C.-800° C. for 2 seconds-30 minutes.

14 Claims, 7 Drawing Sheets

(51) Int. Cl.
    *C04B 35/528*    (2006.01)
    *C04B 35/64*    (2006.01)
    *C04B 38/00*    (2006.01)
    *H01G 11/28*    (2013.01)
    *H01G 11/36*    (2013.01)
    *B22F 3/105*    (2006.01)

(52) U.S. Cl.
    CPC ........... *C04B 38/009* (2013.01); *H01G 11/28* (2013.01); *H01G 11/36* (2013.01); *B22F 3/105* (2013.01); *C01P 2002/82* (2013.01); *C01P 2006/40* (2013.01); *C04B 2235/422* (2013.01); *C04B 2235/428* (2013.01); *C04B 2235/446* (2013.01); *C04B 2235/6581* (2013.01); *C04B 2235/666* (2013.01)

(56) References Cited

U.S. PATENT DOCUMENTS

| | | | |
|---|---|---|---|
| 11,192,788 | B2 | 12/2021 | Ozyilmaz et al. |
| 2013/0183511 | A1 | 7/2013 | Dai et al. |
| 2017/0297923 | A1* | 10/2017 | Ghosh ..................... C01B 32/15 |
| 2021/0017026 | A1 | 1/2021 | Ozyilmaz et al. |

FOREIGN PATENT DOCUMENTS

| | | |
|---|---|---|
| CN | 110357074 A | 10/2019 |
| WO | WO-2018/156082 A1 | 8/2018 |

OTHER PUBLICATIONS

Ukhina, Arina V., et al. "Porous electrically conductive materials produced by Spark Plasma Sintering and hot pressing of nanodiamonds." Ceramics International 41.9 (2015): 12459-12463.*
Su, Shi, et al. "Spark plasma sintering compaction of hybrid nanodiamond/carbon nanotubes/metal electrode and its application." Diamond and Related Materials 104 (2020): 107746.*
Wang, Ye et al. "Pre-lithiation of onion-like carbon/MoS$_2$ nanourchin anodes for high performance rechargeable lithium ion batteries." Nanoscale; 2014.
Mao, Shun et al. "Hierarchical nanohybrids with porous CNT-networks decorated crumpled graphene balls for supercapacitors." ACS Applied Materials & Interfaces; 2014.
Office Action issued in Chinese Patent Application No. 202080037333.5 on Aug. 31, 2022.
Abdali et al "Preparation of Electrospun Nanocomposite Nanofibers of Polyaniline/Poly(Methyl Methacrylate) with Amino-Functionalized Graphene" Polymers vol. 9, pp. 1-12, 2017.
Barborini et al "Negatively Curved Spongy Carbon" Applied Physics Letters vol. 81, pp. 3359-3361, 2002.
Bourgeois et al "High-Resolution Transmission Electron Microscopic Study of Nanoporous Carbon Consisting of Curved Single Graphitic Sheets" Philosophical Magazine A vol. 76, pp. 753-768, 1997.
Braun et al "Generating Carbon Schwarzites via Zeolite-Templating" PNAS vol. 115, pp. E8116-E8124, 2018.
Brown "The Hardness of Irradiated Graphite" Carbon vol. 6, pp. 27-30, 1968.

Chen et al "Three-Dimensional Flexible and Conductive Interconnected Graphene Networks Grown by Chemical Vapour Deposition" Nature Materials vol. 10, pp. 424-428, 2011.
Ewing et al "Scale Dependence of Intragranular Porosity, Tortuosity, and Diffusivity" Water Resources Research vol. 46, pp. 1-12, 2010.
German "Sintering Trajectories: Description on How Density, Surface Area, and Grain Size Change" JOM vol. 68, pp. 878-884, 2016.
Guillon et al "Field-Assisted Sintering Technology/Spark Plasma Sintering: Mechanisms, Materials, and Technology Developments" Advanced Engineering Materials vol. 16, pp. 830-849, 2014.
Ishimoto et al "Degradation Responses of Activated-Carbon-Based EDLCs for Higher Voltage Operation and Their Factors" Journal of the Electrochemical Society vol. 156, pp. A563-A571, 2009.
Kang et al "Graphene Papers with Tailored Pore Structures Fabricated from Crumpled Graphene Spheres" Nanomaterials vol. 9, pp. 1-11, 2019.
Khelifa et al "Nanoindentation of Flexible Graphite: Experimental Versus Simulation Studies" Advanced Materials Science vol. 3, pp. 1-11, 2018.
Kotz et al "Aging and Failure Mode of Electrochemical Double Layer Capacitors During Accelerated Constant Load Tests" Journal of Power Sources vol. 195, pp. 923-928, 2010.
Luo et al "Diamond Synthesis From Carbon Nanofibers at Low Temperature and Low Pressure" Scientific Reports vol. 5, pp. 1-6, 2015.
MacKay et al "Diamond from Graphite" Nature vol. 352, p. 762, 1991.
Mason et al "The Young's Modulus of Carbon and Graphite Artefacts" Carbon vol. 5, pp. 493-506, 1967.
Neighbour "Modelling of Dimensional Changes in Irradiated Nuclear Graphites" Journal of Physics D: Applied Physics vol. 33, pp. 2966-2972, 2000.
Nelson et al "Electronic Excitations in Graphene in the 1-50 eV Range: The $\pi$ and $\pi+\delta$ Peaks are Not Plasmons" Nano Letters vol. 14, pp. 3827-3831, 2014.
Nomura et al "4.4 V Supercapacitors Based on Super-Stable Mesoporous Carbon Sheet Made of Edge-Free Graphene Walls" Energy and Environmental Science vol. 12, pp. 1542-1549, 2019.
Ruoff "Personal Perspectives on Graphene: New Graphene-Related Materials on the Horizon" Materials Research Society Bulletin vol. 37, pp. 1314-1318, 2012.
Ryoo et al "Ordered Mesoporous Carbons" Advanced Materials vol. 13, pp. 677-681, 2001.
Shen et al "Spark Plasma Sintering Assisted Diamond Formation From Carbon Nanotubes at Very Low Pressure" Nanotechnology vol. 17, pp. 2187-2191, 2006.
Tevet et al "Friction Mechanism of Individual Multilayered Nanoparticles" PNAS vol. 108, pp. 19901-19906, 2011.
Valencia et al "Theoretical Characterization of Several Models of Nanoporous Carbon" New Journal of Physics vol. 5, pp. 1-16, 2003.
Weingarth et al "Cycle Versus Voltage Hold—Which is the Better Stability Test for Electrochemical Double Layer Capacitors?" Journal of Power Sources vol. 225, pp. 84-88, 2013.
Xu et al "Holey Graphene Frameworks for Highly Efficient Capacitive Energy Storage" Nature Communications vol. 5, pp. 1-9, 2014.
Yang et al "Liquid-Mediated Dense Integration of Graphene Materials for Compact Capacitive Energy Storage" Science vol. 341, pp. 534-537, 2013.
Zhang et al "Thermal Stability of Carbon Nanotubes, Fullerene and Graphite Under Spark Plasma Sintering" Chemical Physics Letters vol. 510, pp. 109-114, 2011.
Zhu et al "Carbon-Based Supercapacitors Produced by Activation of Graphene" Science vol. 332, pp. 1537-1541, 2011.
Ukhina et al "Porous Electrically Conductive Materials Produced by Spark Plasma Sintering and Hot Pressing of Nanodiamonds" Ceramics International vol. 41, pp. 12459-12463, 2015.
"Office Action" for German Patent Application No. 11 2020 002 480.6, Mar. 10, 2025, 12 pages, German Patent Office, Munich, Germany.

(56) References Cited

OTHER PUBLICATIONS

Zhang, et al., Fabrication and Properties of Three-Dimensional Nanoporous Graphene Foams with Magnesium Binder, Scripta Materialia, 2016, pp. 89-93, vol. 111, Elsevier.

* cited by examiner

Hierarchal pore structure
(Macro, meso and micro pores)

MONOLITHIC AND FRACTAL CARBON FOAMS AND METHODS OF PREPARING AND USING SAME

CROSS-REFERENCE TO RELATED APPLICATIONS

The present patent application is the national stage of International Patent Application No. PCT/SG2020/050273, filed May 13, 2020, which claims the benefit of priority based on U.S. Provisional Application No. 62/851,793, filed May 23, 2019. Furthermore, the entire content and disclosures of the International patent application and the US provisional patent application are incorporated herein by reference in their entirety.

BACKGROUND

Field of the Invention

The present invention relates generally to highly porous carbon foams and the preparation thereof.

BACKGROUND OF THE INVENTION

Energy storage, such as in supercapacitors, is important for improving energy efficiency. Previous studies have shown that nano-carbon foams are suitable materials for constructing electrodes in supercapacitors. However, existing methods of preparing nano-carbon foams are not scalable for industrial production.

For example, chemical solution-based methods require a significant number of pre- and post-processing steps. As a result, these methods are not only both time-consuming and costly, they also generate chemical waste. Moreover, these methods produce nano-carbon foams containing impurities due to use of chemical reagents and surfactants.

As another example, U.S. Patent Application Publication No. U.S. 2017/0297923 A1 reports a hot-pressing method for preparing a nano-carbon foam from hollow onion-like carbon nanoparticles. This hot-pressing method eliminates the need for chemical reagents and surfactants. Yet, the nano-carbon foam produced thereby has low mechanical stability and inconsistent foam density.

Thus, there is a need for novel methods suitable for industrial scale production of nano-carbon foams having improved structural and mechanical properties.

SUMMARY

In one aspect, the present invention relates to a monolithic carbon foam that contains fused onion-like carbon ("OLC") nanoparticles having interconnected pores, has a volumetric micropore surface area of 200 $m^2/cc$-600 $m^2/cc$ (preferably, 200 $m^2/cc$-500 $m^2/cc$), and has an electrical conductivity of 20 s/cm-140 s/cm (preferably, 40 s/cm-75 s/cm). In one embodiment, the foam has a Young's modulus of 1 Gpa-4 GPa (preferably 1 Gpa-3 GPa). In another embodiment, the foam further contains a material that is a non-OLC-based material (preferably including activated carbon), a semiconductor material, an oxide material, or a metal; specific examples of the material include silicon, molybdenum oxide, and molybdenum disulfide. The material can be in the form of a fiber, a tube, a hollow sphere, a wire, a sheet, or a powder. Also covered by the present invention is a foam powder prepared by crushing the above-described monolithic carbon foam.

The above-described monolithic carbon foam can be prepared by (i) compacting OLC nanoparticles, (ii) placing the compacted OLC nanoparticles in a vacuum or in a space filled with an inert gas (e.g., $N_2$ and Ar), and (iii) spark plasma sintering the OLC nanoparticles at a pressure of 30 MPa-1000 MPa (preferably, 40 MPa-300 MPa) and a temperature of 300° C.-800° C. (preferably, 400° C.-600° C.) for a duration of 2 seconds-30 minutes. In one embodiment, the OLC nanoparticles is compacted with a material in the form of a fiber, a tube, a hollow sphere, a wire, a sheet, or a powder, the material being a non-OLC-based material, an oxide material, a metal, and a semiconductor material. In addition to this method, a monolithic carbon foam prepared thereby is within the scope of the instant invention as well.

In another aspect, the present invention relates to a fractal carbon foam. The fractal carbon foam is prepared by (i) crushing the monolithic carbon foam described above to form a monolithic carbon foam powder, (ii) compacting the monolithic carbon foam powder, (iii) placing the compacted monolithic carbon foam powder in a vacuum, and (iv) spark plasma sintering the monolithic carbon foam powder at a pressure of 30 MPa-1000 MPa (preferably, 40 MPa-200 MPa) and a temperature of 300° C.-800° C. (preferably, 600° C.-800° C.) for 2 seconds-30 minutes (preferably, 2 seconds-10 minutes) to form the fractal carbon foam. This method is also within the scope of this invention.

Also disclosed herein are an electrode for use in a supercapacitor containing an active material made of the above-described monolithic or fractal carbon foam and a supercapacitor including such an electrode. More specifically, a supercapacitor of this invention including (i) a negative electrode and a positive electrode both formed of the monolithic or fractal carbon foam depicted above, (ii) a separator disposed between the negative and positive electrodes to prevent a short circuit by direct contact thereof, and (iii) an electrolyte ionically connecting the electrodes, in which the inner surface of each electrode contacts with the electrolyte and the outer surface of each electrode is covered by a current collector.

The details of the invention are set forth in the drawings, the definitions, and the detailed description below. Other features, objects, and advantages of the invention will be apparent from the following actual examples and claims.

BRIEF DESCRIPTION OF THE DRAWINGS

The description below refers to the accompanying drawings, of which.

DETAILED DESCRIPTION OF THE INVENTION

Figure 1A:
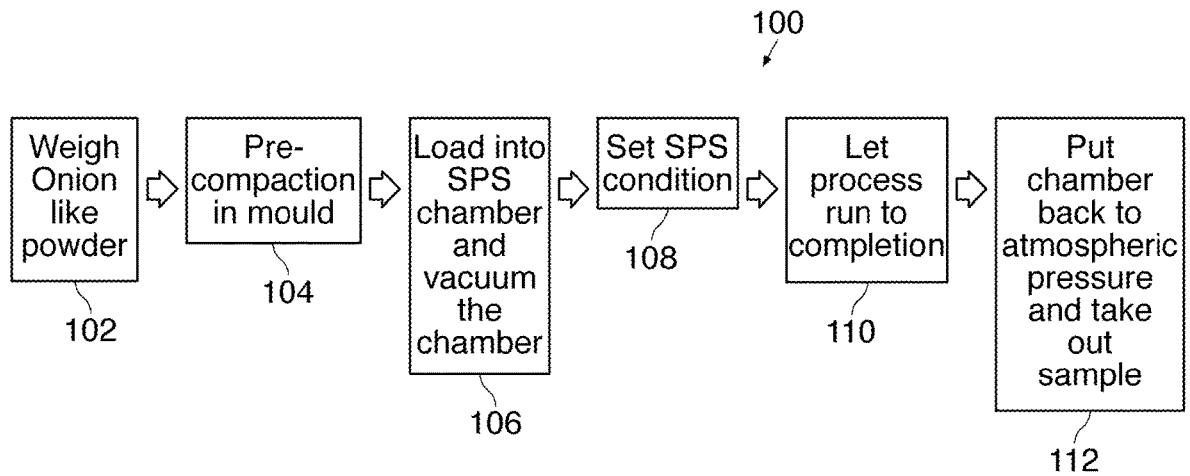
FIG. 1(a) is a schematic representation of spark plasma sintering ("SPS") of OLC particles.

Described in detail below are the monolithic carbon foam, the fractal carbon foam, the methods of preparing them, and the supercapacitors constructed from them as set forth in the SUMMARY section above.

For purposes of the present disclosure, the term "onion-like carbon nanoparticles" or "OLC nanoparticles" refers to quasi-spherical nanoparticles consisting of fullerene-like carbon layers enclosed by concentric graphitic shells. They exhibit unique zero-dimensional spherical or concentric shell structures with small (e.g., <50 nm) diameters. They are also commonly referred to as nano-onions. These nanoparticles have properties different from other carbon nanostructures such as graphite, nanodiamonds, and nanotubes due to their highly symmetric structure.

Furthermore, the term "spark plasma sintering" or "SPS" refers to a pressure-assisted pulsed-current or direct current process in which powder samples are loaded in an electrically conducting die and sintered under a uniaxial pressure. Spark plasma sintering is a technique that uses pressure-driven powder consolidation in which a pulsed direct electric current passes through a sample compressed in a graphite matrix. It is also known as field-assisted sintering or pulse electric current sintering. The term "hot-press" refers to a process that supplies thermal energy from an external heating source to a sample with applied pressure.

Finally, the term "monolithic carbon foam" refers to a material prepared by SPS onion-like carbon nanoparticles, the term "monolithic carbon foam powder" refers to the powder formed by crushing monolithic carbon foam by any known means, and the term "fractal carbon foam" refers to a carbon foam formed from monolithic carbon foam powder.

To reiterate, a monolithic carbon foam of this invention (i) contains fused OLC nanoparticles having interconnected pores, (ii) has a volumetric micropore surface area of 200 $m^2$/cc-600 $m^2$/cc, and (iii) has an electrical conductivity of 20 s/cm-140 s/cm. The foam can be prepared by first compacting OLC nanoparticles and then subjecting the compacted OLC nanoparticles in a vacuum or inert gas environment or in a space filled with an inert gas to a SPS process at a pressure of 30 MPa-1000 MPa and a temperature of 300° C.-800° C. for 2 seconds-30 minutes.

In one embodiment, the monolithic carbon foam thus prepared contains micropores, mesopores, and, optionally, macropores, which, respectively, have diameters of 0.723 nm-2 nm, 2 nm-50 nm, and >50 nm.

In another embodiment, the monolithic carbon foam has a volumetric micropore surface area higher (e.g., 500%-1435%) than that of the OLC nanoparticles and its material density increases (e.g., 0.1 g/cc to 1 g/cc) with respect to the OLC nanoparticles, whereas its gravimetric total surface area decreases minimally (e.g., from 1200 $m^2$/g to 857 $m^2$/g) also with respect to the OLC nanoparticles.

The monolithic carbon foam can be a hybrid monolithic carbon foam, namely, a doped monolithic carbon foam that includes a carbon-based material (e.g., activated carbon), an oxide material (e.g., molybdenum oxide), a metal, and a semiconductor material (e.g., silicon and molybdenum disulfide). The material can be in the form of fibers, tubes, hollow spheres, 2D materials, or powders. In a preferred embodiment, the material is 2D molybdenum disulfide ($MoS_2$). In another preferred embodiment, the material is silicon nanoparticles.

Further covered by this invention is a fractal carbon foam prepared from the above-described monolithic carbon foam by crushing the monolithic carbon foam to form a monolithic carbon foam powder; compacting the monolithic carbon foam powder, placing the compacted monolithic carbon foam powder in a vacuum or inert gas environment or in a space filled with an inert gas, and subjecting the monolithic carbon foam powder to a SPS process at a pressure of 30-1000 MPa and a temperature of 300-800° C. for 2 seconds-30 minutes.

Typically, the fractal carbon foam of this invention has a hierarchical pore structure, i.e., including interconnected micropores, mesopores, and macropores. The micropores, the mesopores, and the macropores, respectively, have diameters of 0.723 nm-2 nm, 2 nm-50 nm, and >50 nm.

A hybrid fractal carbon foam, another contemplated invention, can be formed from the hybrid monolithic carbon foam described above.

Also within the scope of this invention is an electrode for use in a supercapacitor, the electrode containing an active material made of the monolithic or fractal carbon foam described above. The supercapacitor includes such a negative electrode and such a positive electrode, a separator disposed between the negative and positive electrodes to prevent a short circuit by direct contact thereof, and an electrolyte ionically connecting the electrodes, in which the inner surface of each electrode contacts with the electrolyte and the outer surface of each electrode is covered by a current collector. A suitable material, such as an Al laminated file, can be used to package the supercapacitor.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever.

All publications, including patent documents, cited herein are incorporated by reference in their entirety.

Example 1: Preparation and Characterization of Non-Doped Monolithic Carbon Foams Non-doped monolithic carbon foams were prepared according to the process shown in FIG. 1(a) (100) and described below.

Briefly, OLC nanoparticles (Ketjenblack® EC-600JD, LION Specialty Chemicals Co., Ltd.) of a desired weight (102) were compacted in a mold (104). Subsequently, the compacted OLC nanoparticles were loaded into a SPS chamber, which was then evacuated to subject these nanoparticles to a vacuum (106). Thereafter, the OLC nanoparticles were spark plasma sintered under desired conditions (e.g., a pressure of 110 MPa and a temperature of 600° C. for 30 minutes) (108 and 110) to generate a monolithic carbon foam. A conventional paste-based coating process was optionally used to form a thin film (<100 μm) before the SPS process. The pressure in the SPS chamber was then reestablished at atmospheric pressure, after which the monolithic carbon foam was removed from the SPS chamber (112).

Figure 1B:
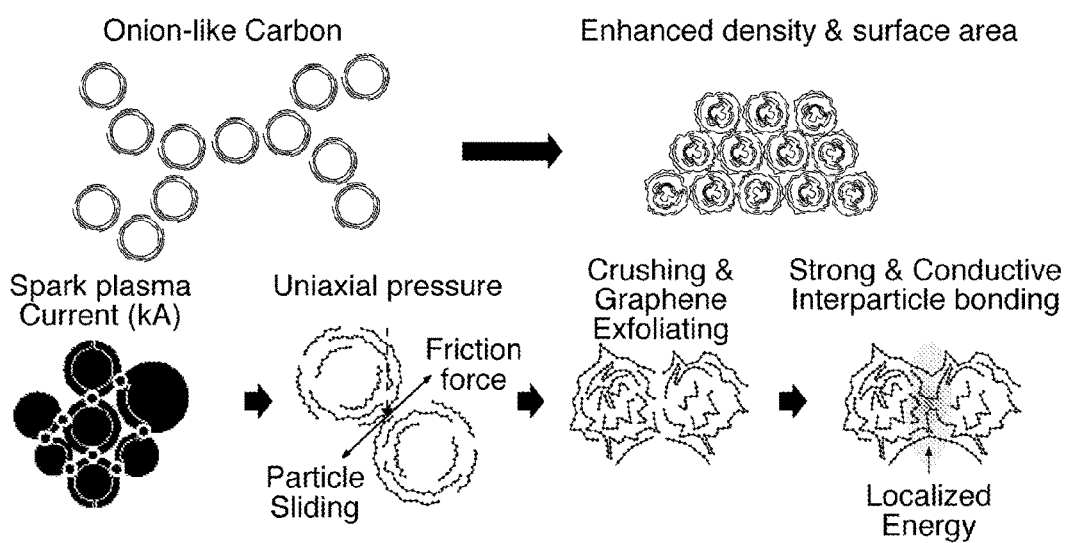
FIG. 1(b) are schematic illustrations showing that SPS transforms OLC particles into a monolithic carbon foam having enhanced density and surface and strong and conductive interparticle bonding.

As illustrated in FIG. 1(b), during the SPS process, the OLC nanoparticles were crushed and restructured through fusing neighboring nanoparticles, thereby resulting in a monolithic carbon foam. More specifically, the uniaxial pressure applied to the OLC nanoparticles during this process induced particle sliding and frictional force between the nanoparticles, which in turn, led to the crushing and exfoliating of these nanoparticles, thus generating the microporous surface of the monolithic carbon foam. It was unexpected that the localized energy generated by the SPS process induced strong and conductive interparticle bonding in the resulting carbon foam.

In general, conventional sintering processes lower the surface area of a sample while increasing its material density. By contrast, as shown in Table 1 below, while the above-described process resulted in monolithic carbon foams having increased densities as compared to OLC nanoparticles, the gravimetric micropore surface and volumetric micropore surface areas of micropore of these foams were unexpectedly higher than those of the nanoparticles.

For example, the OLC nanoparticles had a density of 0.1 g/cc and volumetric micropore surface area of 34.6 m²/g, whereas a monolithic carbon foam, having a density of 1 g/cc, had a volumetric micropore surface area of 497.47 m²/g. In other words, the process of this invention increased the volumetric micropore surface area of the OLC nanoparticles from 34.6 m²/cc to 497.47 m²/cc, i.e., a 1435% enhancement.

TABLE 1

Gravimetric and volumetric surface areas of SPS-processed monolithic carbon foams

|  | OLC nanoparticles (0.1 g/cc) | Monolithic carbon foam (0.55 g/cc) | Monolithic carbon foam (0.75 g/cc) | Monolithic carbon foam (1 g/cc) |
|---|---|---|---|---|
| Gravimetric micropore surface area <2 nm (m²/g) | 346.57 | 453.72 | 479.25 | 497.47 |
| Gravimetric total surface area (m²/g) | 1174 | 1083 | 945 | 857 |
| Volumetric micropore surface area <2 nm (m²/cc) | 34.6 | 249.546 | 359.4375 | 497.47 |
| Volumetric total surface area (m²/cc) | 117.4 | 595.65 | 708.75 | 857.00 |

Figure 1C:
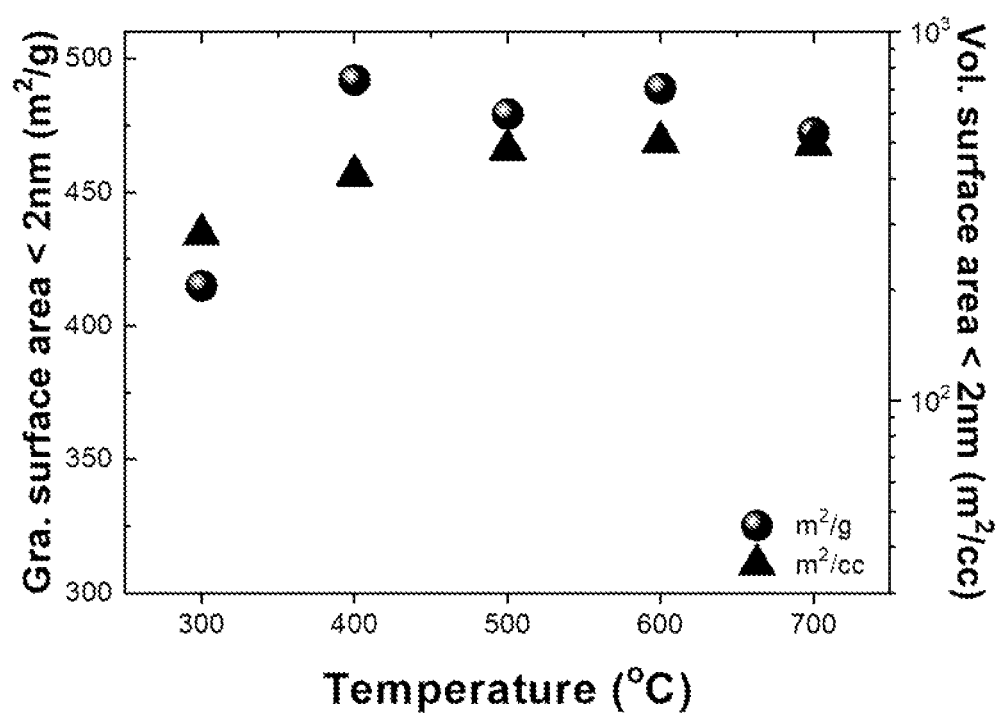
FIG. 1(c) is a graph showing the gravimetric and volumetric surface areas of monolithic carbon foams prepared at a pressure 80 MPa and at various temperatures, i.e., 300-700° C.

The above-described process provides monolithic carbon foams having micropores and mesopores at various ratios, which are preferred for different applications. For example, a higher percentage of micropores is preferred for energy storage applications, e.g., supercapacitors, as it maximizes energy density. On the other hand, a greater percentage of mesopores is preferred for applications requiring higher power density, as it permits faster charging and discharging. A suitable combination of micropores and mesopores is crucial for optimizing both the energy density and the power density of a supercapacitor. Through the SPS process, the ratio of micropores and mesopores can be controlled by adjusting the temperature and pressure at which the process is performed. For example, as shown in FIG. 1(c), both the gravimetric and volumetric surface areas of a monolithic carbon foam were enhanced by increasing the temperature, e.g., from 300° C. to 700° C., at which the SPS process was performed, while keeping the pressure at 80 MPa.

A study was performed to compare the mechanical stability of the monolithic carbon foam prepared by the SPS method described above and the carbon foams prepared by three conventional methods, i.e., (1) hot-pressing at 800° C. and 40 MPa, (2) cold-pressing at 1 GPa followed by annealing at 800° C., and (3) cold-pressing at 1 GPa. More specifically, the SPS-processed monolithic carbon foam and the hot-pressed/cold-pressed monolithic carbon foams were sonicated in isopropyl alcohol (IPA) for 5 minutes (sonication power of 600 W). All three samples containing carbon foams prepared by the conventional methods disintegrated and dispersed, as evidenced by tinting of IPA. By contrast, the sample containing SPS-processed monolithic carbon foam remained clear, indicating that this monolithic carbon foam, mechanically stable, was intact after sonication.

Figure 2A:
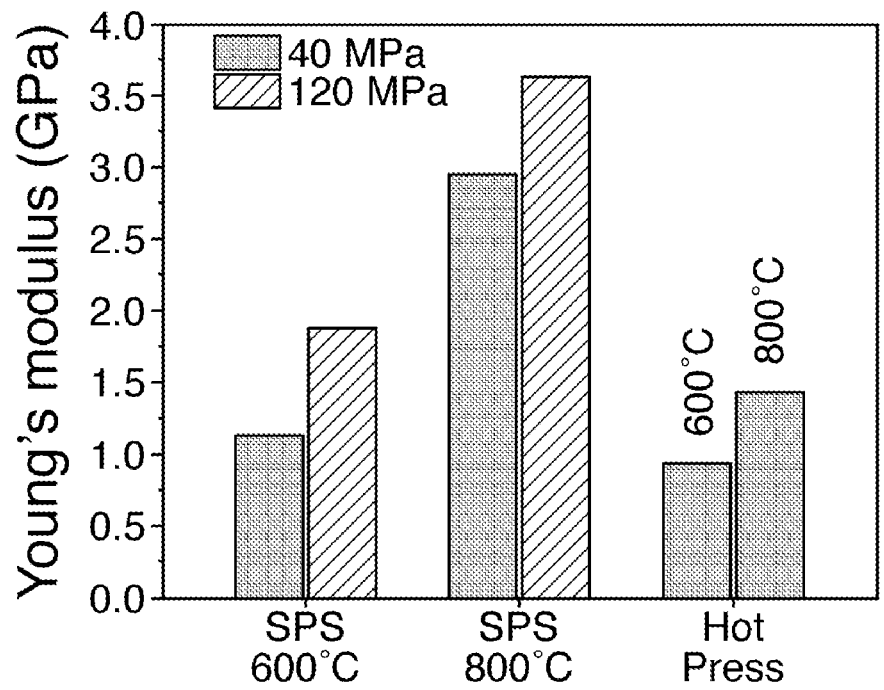
FIG. 2(a) is a graph showing the Young's moduli of a monolithic carbon foam prepared by the SPS process and a carbon foam prepared by a conventional hot-pressing process.

To quantify the differences in mechanical stability between monolithic carbon foams prepared by the above-described SPS process and carbon foams prepared by the conventional hot-pressing process, a second study was conducted to measure the Young's moduli of carbon foams prepared by the six processes: (1) SPS-processed at 600° C. and 40 MPa, (2) SPS-processed at 600° C. and 120 MPa, (3) SPS-processed at 800° C. and 40 MPa, (4) SPS-processed at 800° C. and 120 MPa, (5) hot-pressed at 600° C. and 40 MPa, and (6) hot-pressed at 800° C. and 40 MPa. The results of this study, shown in FIG. 2(a), demonstrate that the SPS-processed monolithic carbon foams unexpectedly had Young's moduli greater than the hot-pressed carbon foams.

The results of these two studies demonstrate the unexpected mechanical stability of SPS-processed monolithic carbon foam of this invention, as compared to carbon foams prepared by prior art methods.

Figure 2B:
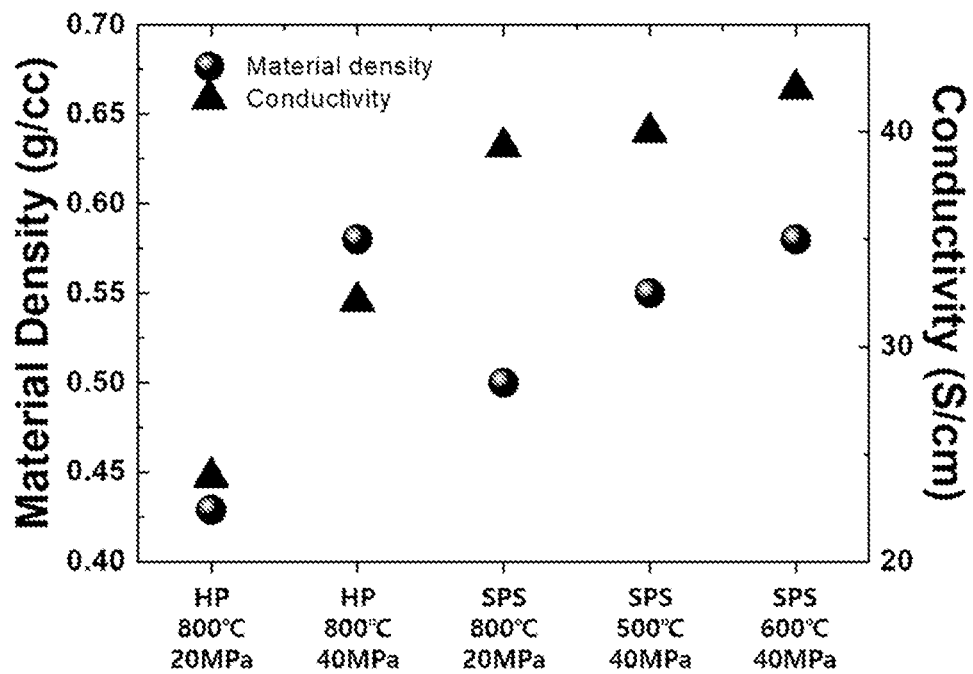
FIG. 2(b) is a graph showing the conductivity and material density of SPS-processed monolithic carbon foams and conventional hot-pressed monolithic carbon foams.

A different study was conducted to compare the conductivities and densities of the SPS-processed monolithic carbon foams prepared under three conditions, i.e., 800° C. and 20 MPa, 500° C. and 40 MPa, and 600° C. and 40 MPa, with two conventional hot-pressed carbon foams, i.e., hot-pressed at 800° C. and 20 MPa and at 800° C. and 40 MPa. The results of this study, shown in Table 2 below and in FIG. 2(b), indicate that the SPS-processed monolithic carbon foams, regardless of preparation conditions, unexpectedly had higher conductivities than the hot-pressed carbon foams. Under the same condition, i.e., 800° C. and 20 MPa, the SPS-processed monolithic carbon foams unexpectedly had higher density than the hot-pressed carbon foams.

TABLE 2

Conductivities and densities of SPS-processed monolithic carbon foams and hot-pressed monolithic carbon foams

|  | Hot-pressed (800° C., 20 MPa) | Hot-pressed (800° C., 40 MPa) | SPS-processed (800° C., 20 MPa) | SPS-processed (500° C., 40 MPa) | SPS-processed (600° C., 40 MPa) |
|---|---|---|---|---|---|
| Density (g/cc) | 0.429 | 0.58 | 0.5 | 0.55 | 0.58 |
| Conductivity (S/cm) | 23.94 | 32.12 | 39.31 | 40 | 42 |

Figure 3:
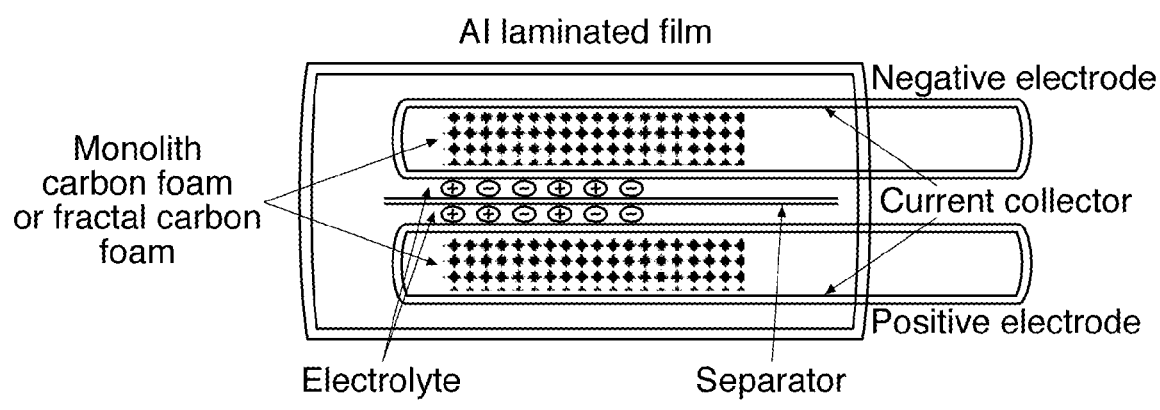
FIG. 3 is a schematic illustration of an exemplary pouch-cell type supercapacitor, which contains a monolithic carbon foam or a fractal carbon foam.

The monolithic carbon foam can be used as an electrode for supercapacitors that do not contain conductive additives and binders. OLC nanoparticles were compacted in a mold. Subsequently, the compacted OLC nanoparticles were loaded into a SPS chamber, which was then evacuated to subject these nanoparticles to a vacuum. Thereafter, the OLC nanoparticles were spark plasma sintered under a pressure of 30 MPa and a temperature of 600° C. for 10 minutes Eliminating conductive additives and binders from an electrode is desirable, as they reduce energy density and hinder performance severely. FIG. 3 shows an exemplary pouch-cell type supercapacitor containing a monolithic carbon foam electrode (or a fractal carbon foam, preparation of which is described in EXAMPLE 2 below). The supercapacitor was constructed based on a commercial laboratory test setup for supercapacitor analysis.

The capacitance retention of an exemplary supercapacitor, indicative of its lifetime, was compared to a commercial supercapacitor having a binder-based paste coated activated carbon electrode (3.0 V, 70° C., SBPBF4/PC electrolyte). The results are shown in Table 3 below. Of note, capacitance retention was calculated by:

$$\frac{\text{Capacitance after reliability test}\left(\frac{F}{g}\right)}{\text{Capacitance of As prepared device}\left(\frac{F}{g}\right)} \times 100$$

TABLE 3

Capacitance retention for supercapacitors containing SPS-processed monolithic carbon foam or activated carbon

|  | Load time (hrs.) | | | |
|---|---|---|---|---|
| Supercapacitor | 0 | 150 | 300 | 500 |
| SPS-processed monolithic carbon foam (%) | 100 | 102 | 100 | 100 |
| Activated carbon (%) | 100 | 85 | 82 | 80 |

As shown in Table 3 above, after a 500-hour reliability test conducted at 3.0 V and 70° C., the supercapacitor containing the monolithic carbon foam unexpectedly had a capacity retention of 100%, whereas the activated carbon device had a capacity retention of only 80%. These results indicate that, unlike the commercial supercapacitor, the monolithic carbon foam-containing supercapacitor is suitable for use at a rated voltage of 3.0 V.

Example 2: Preparation and Characterization of a Fractal Carbon Foam

A fractal carbon foam was prepared by a procedure adapted from that used to prepare monolithic carbon foams set forth in EXAMPLE 1 above.

More specifically, a monolithic carbon foam was crushed into a powder having a grain size of a few hundred nanometers to a few microns. The monolithic carbon foam powder was then subjected to the SPS process described in EXAMPLE 1.

Figure 4A:
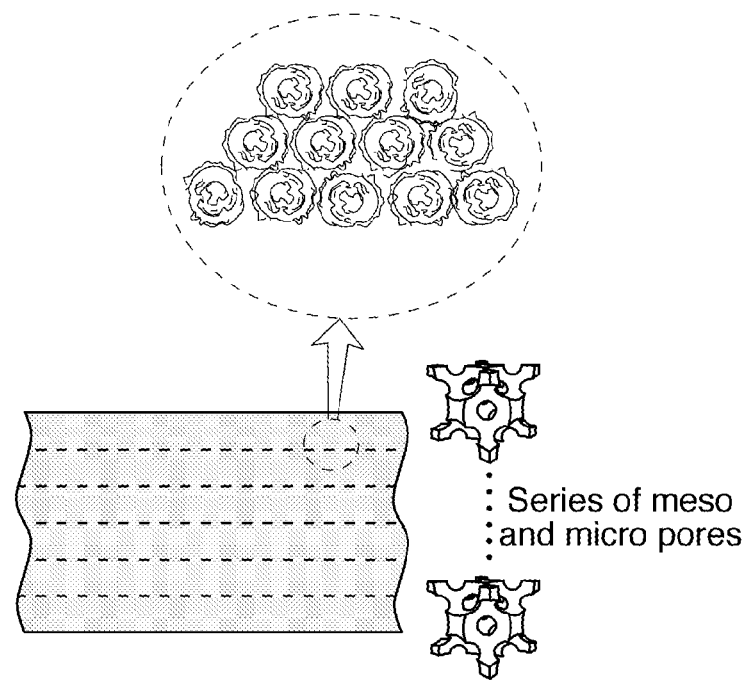
FIG. 4(a) is a schematic illustration of a monolithic carbon foam according to an embodiment of the present invention. The monolithic carbon foam, formed from OLC nanoparticles, has a pore structure characterized by a series of mesopores and micropores.
Figure 4B:
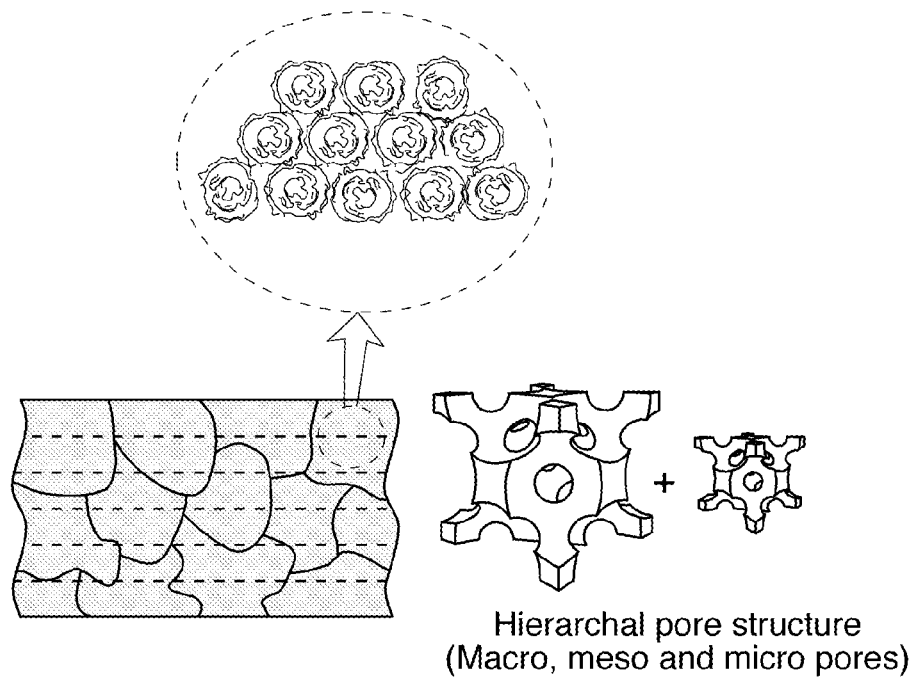
FIG. 4(b) is a schematic illustration of a fractal carbon foam according to an embodiment of the present invention. This fractal carbon foam, formed from monolithic carbon foam powder, has a hierarchical pore structure characterized by macropores connected to a series of mesopores and micropores in the monolithic carbon foam powder.

The fractal carbon foam thus prepared had an interconnected hierarchical pore structure, in which macropores were connected to the mesopores and micropores contained in the monolithic carbon foam powder. Compared to the pore structure of the monolithic carbon foam shown in FIG. 4(a), which did not contain a macropore-network, the pore structure of the fractal carbon foam shown in FIG. 4(b) included macropore-network that provided a greater pore accessibility. The greater pore accessibility of the fractal carbon foam facilitated diffusion of ions and molecules. Indeed, Nyquist plots of a 100 μm monolithic graphene foam ("MGF") electrode and a 100 μm fractal graphene foam ("FGF") electrode (see FIG. 5, inset) show that the diffusion speed of ions was faster in the FGF electrode, as evidenced by the steeper slope of its Nyquist plot.

Figure 5:
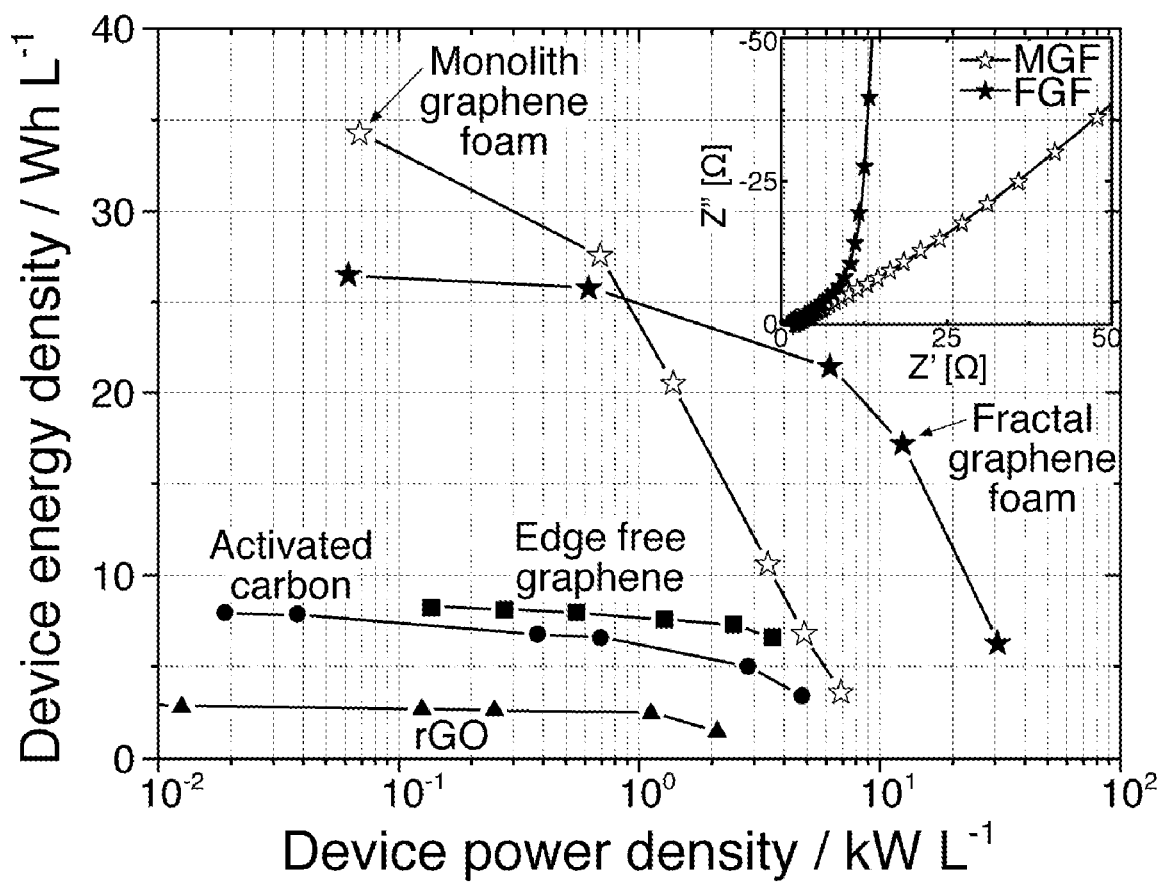
FIG. 5 is a Ragone plot showing a comparison of device performance of supercapacitors containing different electrode materials, i.e., monolithic graphene foam ("MGF"), fractal graphene foam ("FGF"), activated carbon, edge free graphene, and reduced graphite oxide ("rGO"); the inset is an overlay of Nyquist plots of the MGF electrode and FGF electrode showing the diffusion speed of ions within these electrodes, wherein a steeper slope corresponds to a higher diffusion rate.

A study was conducted to compare the device performance of supercapacitors containing different electrode materials, i.e., monolithic graphene foam, fractal graphene foam, activated carbon, edge free carbon, and reduced carbon oxide ("rGO"). The results are shown in FIG. 5, a Ragone plot. It was found that the fractal graphene foam, while having lower energy as compared to the monolithic graphene foam, had a higher power density due to its greater pore accessibility. Importantly, both the fractal graphene foam and the monolithic graphene foam had higher energy and power densities as compared to activated carbon, edge free carbon, and rGO. In other words, the carbon foams of this invention, both monolithic and fractal, are unexpectedly superior to the other carbon materials in supercapacitor applications.

Example 3: Preparation and Characterization of Hybrid Monolithic Carbon Foams

Two hybrid monolithic carbon foams, i.e., a $MoS_2$/carbon hybrid monolithic carbon foam and a Si/carbon hybrid monolithic carbon foam were prepared via procedures described below.

For the $MoS_2$/carbon hybrid monolithic carbon foam, a $MoS_2$/carbon precursor material containing Ketjenblack (AkzoNobel; EC600 grade) and $MoS_2$ was first prepared. Briefly, 10 mg of Ketjenblack and 20 mg of ammonium tetrathiomolybdate (Sigma-Aldrich) were respectively dispersed in 10 mL and 2 mL of N,N-dimethylformamide ("DMF"). Both dispersions were sonicated for 30 minutes, mixed together, and then sonicated for 2 hours to allow for the Ketjenblack to be thoroughly impregnated with ammonium tetrathiomolybdate. The resulting solution was transferred into a 25 mL Teflon-lined stainless steel autoclave and tightly sealed. The autoclave was heated at 200° C. for 15 hours and allowed to cool to room temperature. The resulting $MoS_2$/carbon precursor material was collected by centrifugation and washed with several aliquots of ethanol and deionized water. The washed precursor material was dried overnight in an oven at 60° C.

Figure 6:
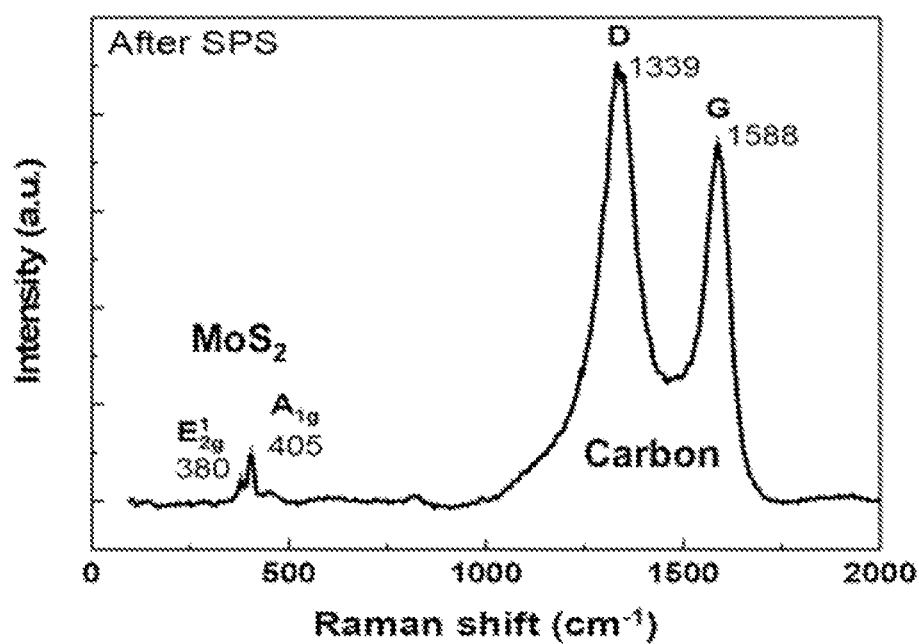
FIG. 6 is a Raman spectrum of a $MoS_2$/carbon hybrid monolithic carbon foam.

To obtain the MoS$_2$/carbon hybrid monolithic carbon foam, a spray-gun was connected with a nitrogen gas supply and mounted at 10 cm from the tip of the nozzle above a hotplate, where Mo circular foils (Alfa Aesar; 14 mm diameter, effective area 1.4 cm$^2$) were secured with heat resistance tape. The Mo foils were used as current collectors. The MoS$_2$/carbon precursor material was dispersed in DMF and used as the feedstock for spraying. The hotplate was heated at 190° C. to dry the Mo foils. Mass loading of up to 1 mg/cm$^2$ was obtained by varying the duration of spraying. To perform the SPS process, the electrodes were sandwiched between graphite foils then loaded into a tungsten carbide mold. SPS was conducted at 500° C. and 600° C. with a uniaxial pressure of 2-30 MPa for 30 minutes under vacuum. The mold was cooled rapidly afterwards with the cooling water system in the furnace, after which the hybrid monolithic carbon foam thus formed was removed from it. The resulting MoS$_2$/carbon hybrid monolithic carbon foam was characterized by Raman spectroscopy, which confirmed the presence of both MoS$_2$ and carbon in the foam. See FIG. 6.

For the Si/carbon monolithic carbon foam, a precursor solution containing Si nanoparticles ("SiNP"), trimethoxymethylsilane ("TMMS"), and Ketjenblack was first prepared prior to the SPS process. More specifically, 20 mg Si nanopowder (US Research Nanomaterials, Inc.; diameter=30-50 nm) was dispersed in 40 ml ethanol by batch sonication for 2 hours, after which 1 mL of TMMS (Sigma Aldrich; 98%) was added to the solution and sonicated for 1 hour. Subsequently, 6.6 mg of Ketjenblack (AkzoNobel; EC600 grade) was dispersed in 40 ml of isopropyl alcohol ("IPA") for 2 hours to obtain a homogeneous solution. The two solutions were then mixed together and sonicated for 1 hour to obtain a well-dispersed SiNP/TMMS/Ketjenblack precursor solution.

To obtain the Si/carbon hybrid monolithic carbon foam, Mo circular foils (Alfa Aesar; 14 mm diameter, effective area ~1.4 cm$^2$) were placed on a hotplate heated set to 50° C. A spray-gun was then connected with a nitrogen gas supply and mounted at 10 cm (from the tip of the nozzle) above the hotplate. The SiNP/TMMS/Ketjenblack precursor solution was slowly sprayed on the Mo foil to drive out ethanol and IPA, thereby obtaining a Si/Ketjenblack films on the foil. The Si/Ketjenblack films were then subjected to the SPS process, which was performed at 800° C. and a uniaxial pressure of 2-30 MPa for 30 minutes under vacuum.

The cycling performance of the two hybrid monolithic carbon foams as electrodes in Li-ion batteries were tested. It was found that these two hybrid foams unexpectedly retained high capacity after as many as 800 cycles, indicating that these materials are excellent electrode materials for Li-ion battery applications.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of preparing a monolithic carbon foam, the method comprising the steps of:
    compacting onion-like carbon (OLC) nanoparticles,
    placing the compacted OLC nanoparticles in a vacuum or in a space filled with an inert gas, and
    spark plasma sintering the OLC nanoparticles at a pressure of 30 MPa to 1000 MPa and a temperature of 300° C. to 800° C. for 2 seconds to 30 minutes to obtain the monolithic carbon foam.

2. The method of claim 1, wherein the spark plasma sintering step is performed at a pressure of 40 MPa to 300 MPa.

3. The method of claim 1, wherein the spark plasma sintering step is performed at a temperature of 400° C. to 600° C.

4. The method of claim 2, wherein the spark plasma sintering step is performed at a temperature of 400° C. to 600° C. for 2 seconds to 10 minutes.

5. The method of claim 1, wherein the OLC nanoparticles is compacted with a material selected from the group consisting of a non-OLC-based material, an oxide material, a metal, and a semiconductor material.

6. The method of claim 5, wherein the material is in the form of a fiber, a tube, a hollow sphere, a wire, a sheet, or a powder.

7. The method of claim 5, wherein the material is silicon, molybdenum oxide, a non-OLC-based material containing activated carbon, or molybdenum disulfide in the form of a sheet.

8. A method of preparing a fractal carbon foam, the method comprising the step of:
    crushing the monolithic carbon foam prepared by the method of claim 1 to form a monolithic carbon foam powder,
    compacting the monolithic carbon foam powder,
    placing the compacted monolithic carbon foam powder in a vacuum or in a space filled with an inert gas, and
    spark plasma sintering the monolithic carbon foam powder at a pressure of 30 MPa to 1000 MPa and a temperature of 300° C. to 800° C. for 2 seconds to 30 minutes to form the fractal carbon foam.

9. The method of claim 8, wherein the monolithic carbon foam powder is sintered at a pressure of 40 MPa to 200 MPa.

10. The method of claim 8, wherein the monolithic carbon foam powder is sintered at a temperature of 600° C. to 800° C.

11. The method of claim 9, wherein the monolithic carbon foam powder is sintered at a temperature of 600° C. to 800° C. for 2 seconds to 10 minutes.

12. The method of claim 8, wherein the monolithic carbon foam contains a material selected from the group consisting of a non-OLC-based material, an oxide material, a metal, and a semiconductor material.

13. The method of claim 12, wherein the material is in the form of a fiber, a tube, a hollow sphere, a wire, a sheet, or a powder.

14. The method of claim 12, wherein the material is silicon, molybdenum oxide, a non-OLC-based material containing activated carbon, or molybdenum disulfide in the form of a sheet.

* * * * *